March 29, 1932.  G. GENOVESI  1,851,044
DISPENSING DEVICE
Filed Feb. 28, 1931   3 Sheets-Sheet 1

Gustave Genovesi
INVENTOR
BY
ATTORNEY

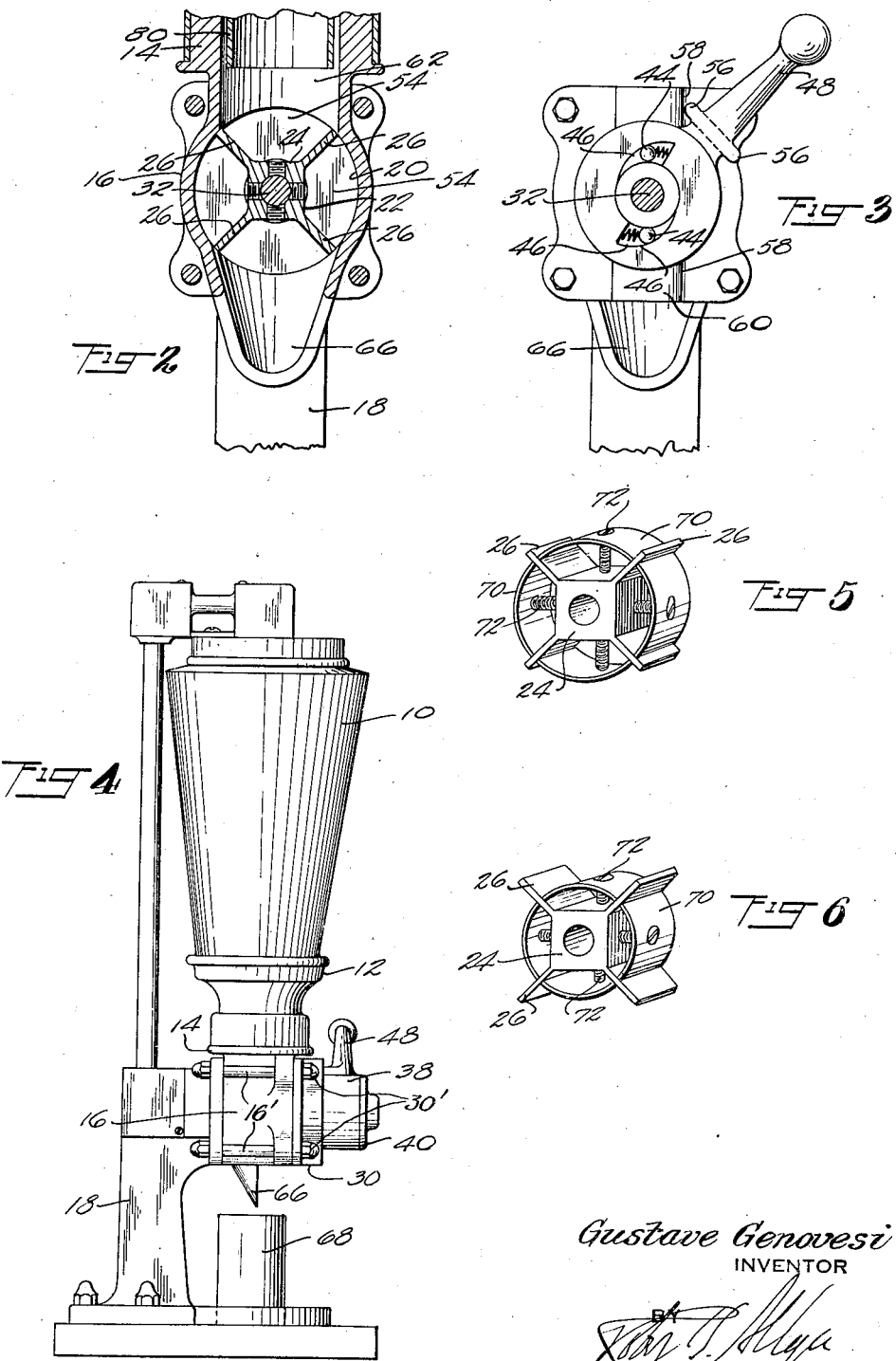

March 29, 1932. G. GENOVESI 1,851,044
DISPENSING DEVICE
Filed Feb. 28, 1931 3 Sheets-Sheet 3
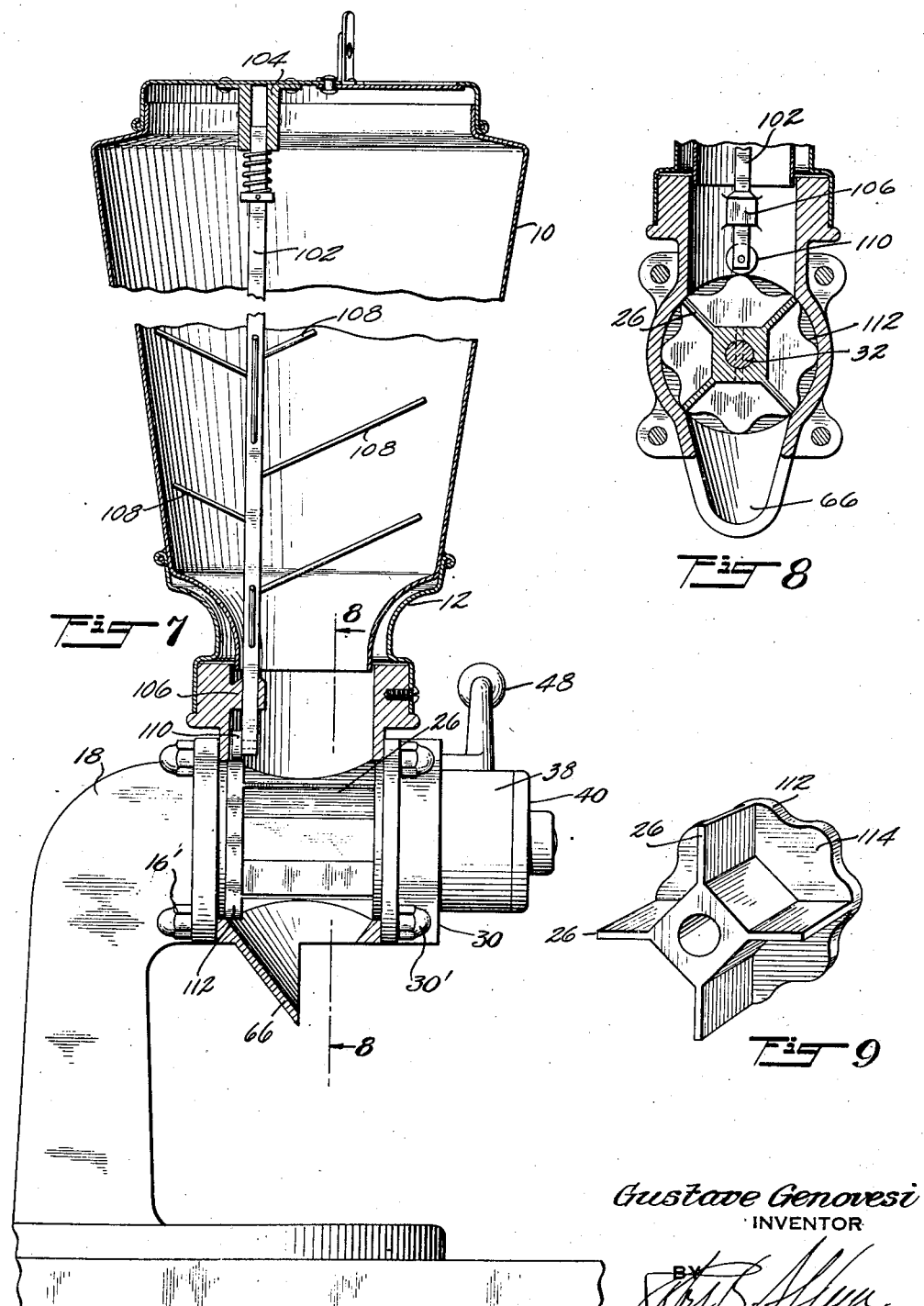
Gustave Genovesi
INVENTOR
BY
ATTORNEY Patented Mar. 29, 1932

1,851,044

UNITED STATES PATENT OFFICE

GUSTAVE GENOVESI, OF NEW YORK, N. Y.

DISPENSING DEVICE

Application filed February 28, 1931. Serial No. 519,050.

My invention relates to a means for dispensing predetermined quantities of a powdered substance, such as sugar, salt, and the like, into suitable receptacles.

One object of my invention is to provide a dispensing apparatus with a mechanism which is manually operated and adapted to measure quantities of sugar, for example, and dispense same into containers.

Another object is to provide an agitator within the hopper which holds the powdered substance to loosen the powdered particles at each stroke of the main operating lever and thereby prevent caking or coagulation.

Another object is to provide adjustable measuring chambers to vary the quantity of the substance to be dispensed.

Another object is to provide mechanism of the character described which can be made cheaply, readily assembled and easily inspected.

A special object is to provide measuring and actuating mechanism which can be readily removed as a unit.

In the annexed drawings, I have shown a preferred form of my device, in which

Fig. 2 is a cross section taken on the line 2—2 of Fig. 1.

Fig. 3 is a cross section taken on the line 3—3 of Fig. 1.

Fig. 4 is a reduced side elevational view of the device shown in Fig. 1.

Fig. 5 is a detail perspective view of the measuring member supplied with large arcuate plates to restrict the space of the measuring chamber.

Fig. 6 is a detail similar to Fig. 5 showing the measuring member supplied with a set of smaller restricting plates.

Fig. 7 is a view similar to Fig. 1 of a modified form of dispensing device.

Fig. 8 is a cross section taken on the line 8—8 of Fig. 7.

Fig. 9 is a detail perspective view of a measuring member with an agitator cam at the rear thereof.

Figure 1:
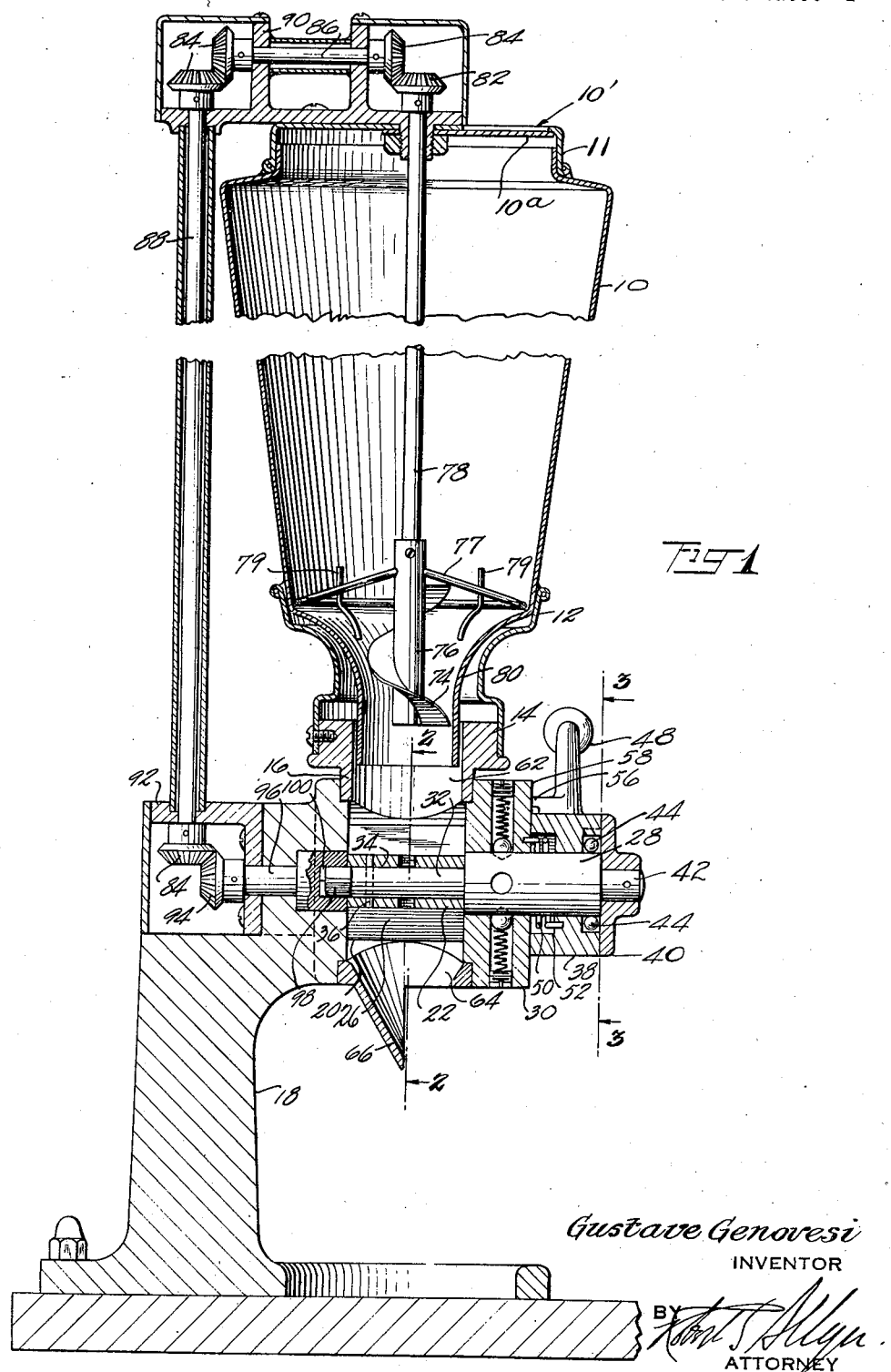
Fig. 1 is a central vertical section through my dispensing device.

A hopper 10, which holds the substance to be dispensed, is supported by a sleeve 12 secured to a collar 14, said collar being formed as a part of the head 16 clamped to the main supporting structure 18 by bolts 16'.

Within the head 16 is a cylindrical opening 20 adapted to receive a measuring member 22 which comprises a center core 24 having outwardly disposed partitions 26 attached thereto, the outer edges of which engage the inside surface of the cylindrical opening 20. A shaft 28 retained within an end plate 30 has a reduced portion 32 which is inserted in an opening 34 in the core 24 and secured thereto by means of the pin 36.

A clutch collar 38 is placed over the outer end of the shaft 28 and retained by a cap 40 secured to the reduced end 42 of the shaft 28. The clutch comprises two spring pressed balls 44 within tapered slotted recesses 46 which are adapted to grip the shaft 28 when the clutch collar 38 is rotated in a clockwise direction by means of the handle 48 on said collar 38, and which releases when the handle is returned.

A spring 50 within a recess 52 is anchored at one end to the stationary end plate 30 and at the other end to the clutch collar 38 and tensioned to return the handle to its upward position.

The arms 26 on the measuring member are positioned 90° apart and arranged in diagonal relation to form pockets 54. The stroke of the handle 48 is limited to a 90° movement by the engagement of lugs 56 on each side of the arm 48, with the side surface 58 of a ridge 60 on the end plate 30.

By the arrangement of diagonal arms, one pocket 54 is always positioned directly beneath an opening 62 in the collar 14, through which the powdered substance passes from the hopper 10; therefore the upper pocket is always filled.

When the handle is moved through one full stroke of 90°, the upper filled pocket is moved to the side and the next pocket is positioned directly under the opening 62 which, of course, is immediately filled. The handle 48 is returned to its upper position without actuating any of the mechanism due to the slipping of the clutch balls 44 over the surface of the shaft 28. Another downward stroke of the handle is made and the filled pocket at the side is moved to the bottom position, whereupon the load within the said pocket is discharged through an opening 64 coinciding with the bottom pocket, and guided by means of a chute 66, into a suitable receptacle 68, shown in Fig. 4. On each stroke of the handle 48 a measured amount of the powdered substance is discharged into the receptacle 68.

Means is provided to vary the quantity of said powdered substance to be dispensed, which comprises arcuate plates 70 of different lengths which are adapted to restrict the pocket spaces of the measuring member 22, as shown in Figs. 5 and 6. These arcuate plates are placed within each pocket and secured by means of screws 72.

The successful operation of a dispensing device of this character depends upon the looseness of the particles within the hopper. To be assured of having a loose, freely flowing substance, I provide spiral blade 74 on a sleeve 76 secured to the lower end of a vertically disposed shaft 78. Said spiral blade is positioned within a reduced neck 80 of the hopper 10. At the upper end of the shaft 78, and outside of a cover 11 on the hopper 10, I mount a bevel gear 82 which is driven in short, intermittent movements by means of the auxiliary bevel gears 84, said bevel gears being secured to shafts 86, 88 mounted in suitable bearing members 90, 92, which receive their driving power from a bevel gear 94 secured to a stub shaft 96. A squared end 98 on the reduced end 32 of the driving shaft 28 is inserted in a squared opening 100 in an enlarged end of the stub shaft 96. Each time the handle 48 is moved downward, the movement is transmitted through shaft 28, and the gears 84 and 82 to the shaft 78, causing the spiral blade 74 to be rotated partially. Each movement of the blade 74 tends to agitate the powdered substance and thereby keep it loose so that it will flow freely through the neck 80 and opening 62. A wire frame 77 attached to the sleeve 76 and having projecting pieces 79 attached thereto may be used as a further means of agitation.

The receptacle 10 is filled through an opening 10' in the top, which opening may be closed by a rotatable shutter 10ª. (Fig. 1).

It will be seen that the measuring device is held by the pin 36 on the shaft 32 inside the plate 30, and the actuating handle and its ratchet mechanism are held on the outer end of the shaft by the cap 40. The head 16 is supported on the standard 18 by the bolts 16' and the plate 30 is held in place by the nuts 30'. When the nuts are removed the plate 30 and the shaft 28 and attached parts may be removed without disturbing the shaft 96 which is geared to the stirrer 74.

In Figs. 7, 8 and 9 I show another means of agitation which comprises a vertically disposed bar 102 guided with upper and lower bearing portions 104, 106, and having rods 108 projecting outwardly from said bar. A roller 110 secured to the lower end of the bar 102 is adapted to engage a cammed edge surface 112 of a disc 114 formed integrally with the measuring member.

With this form of agitator, the bar 102 is given a reciprocating motion by means of the roller riding over the cammed surface 112 each time the handle 48 is moved. As the bar is reciprocated, the rods 108 attached thereto are forced through the powdered substance within the hopper and keep it loose.

The measuring device and actuating mechanism in this form is similar to that above described and is similarly secured in place and similarly removable.

I claim:

1. In a dispenser of the character described, a hopper supported on the projecting head of a supporting stand, a spiral blade secured to a vertically positioned shaft within said hopper, a measuring member comprising a core having four partitions forming four pockets, and positioned within a cylindrical opening in the projecting support head below a discharge opening in the hopper, a drive shaft and clutch driving means adapted to be manually operated to rotate said measuring member intermittently, and a bevel gear driving means connected to said drive shaft to transmit an intermittent motion to the agitator screw.

2. In a dispenser of the character described, a hopper supported on the projecting head of a supporting stand, a vertically disposed agitator bar within said hopper having rods projecting outwardly therefrom, and a roller secured to the bottom thereof, a measuring member comprising a core having a number of partitions forming a number of pockets and positioned within a cylindrical opening in the projecting support head below a discharge opening in the hopper, a plate at one end of the measuring member having a cammed surface adapted to engage the agitator bar roller and a manually operated clutch driving means adapted to impart an intermittent movement to the measuring member and a reciprocating movement to the agitator bar by means of the rotating cam plate.

3. A dispensing mechanism comprising a standard, a head having a measuring chamber, a measuring device mounted in said chamber and having a shaft, over-running clutch mechanism coacting with said shaft and provided with an operating handle, a plate mounted on said shaft and means for simultaneously securing said plate, shaft and head on said standard.

4. A dispensing mechanism comprising a standard, a head having a measuring chamber, a measuring device mounted in said chamber and having a shaft, a plate affording a bearing for said shaft, and a number of bolts for holding said head and said plate on said standard.

5. A dispensing mechanism comprising a standard, a hopper supported by said standard, a measuring device mounted beneath said hopper, actuating means for said measuring device including an operating handle, an agitator movable in said hopper, and driving means of connection between said actuating means and said agitator, said actuating means being removable with said measuring device, and having an over-running clutch mechanism including spring pressed balls for permitting said operating handle to return to its original operative position.

6. A dispensing mechanism comprising a standard, measuring device carried thereby, a hopper supported above said measuring device, said measuring device having a shaft projecting laterally therefrom, actuating means for said shaft, an agitating device mounted in said hopper, a vertical shaft outside of said hopper driven by the shaft of said measuring device, a vertical shaft for said agitator within said hopper, and a counter shaft above the hopper geared to the shaft of said agitator and geared to said vertical shaft.

7. A dispensing mechanism comprising a standard, a head detachably supported by said standard and having a measuring chamber, a measuring device in said chamber having a shaft projecting therefrom, a plate affording a bearing for said shaft detachably connected to said head, actuating mechanism on the outer end of said shaft including an over-running clutch device, a cam mounted on the inner end of said shaft, a hopper supported above said head, an agitator mounted to move in said hopper, and means of connection between said agitator and said cam.

GUSTAVE GENOVESI.